United States Patent

[11] 3,589,180

| | | | | |
|---|---|---|---|---|
| [72] | Inventor | Sandor Kovacs Budapest, Hungary | | |
| [21] | Appl. No. | 837,516 | | |
| [22] | Filed | June 30, 1969 | | |
| [45] | Patented | June 29, 1971 | | |
| [73] | Assignee | Merestechnikai Kozponti Kutato Laboratorium Budapest, Hungary | | |
| [32] | Priority | June 28, 1968 | | |
| [33] | | Hungary | | |
| [31] | | ME-960 | | |

[54] TRANSDUCER WITH TORSIONAL SENSORS IN THE FORM OF STRAIN GAUGES
2 Claims, 12 Drawing Figs.

[52] U.S. Cl. ................................................ 73/141
[51] Int. Cl. ................................................ G01l 5/00
[50] Field of Search............................................ 73/141, 133, 88.5, 517, 382; 338/2, 5

[56] References Cited
UNITED STATES PATENTS

| | | | |
|---|---|---|---|
| 3,309,922 | 3/1967 | Green........................ | 73/141 |
| 3,354,716 | 11/1967 | Wiebe ....................... | 73/198 |
| 3,314,034 | 4/1967 | Caris ......................... | 338/2 |
| 3,427,875 | 2/1969 | Saxl............................ | 73/141 |
| 3,433,064 | 3/1969 | Jacobsen.................... | 73/141 |
| 3,448,424 | 6/1969 | Laimins...................... | 338/5 |

Primary Examiner—Richard C. Queisser
Assistant Examiner—John Whalen
Attorney—Young & Thompson ABSTRACT: A transducer has torsional sensors for strain gauges, the sensors being in the form of torsional components interconnected by a connecting block and having torsional arms that are interconnected by upper and lower connecting members. The force to be measured is applied to the coupling members and the torsional components subjected to torsion about axes all of which lie in the same plane. The connecting block and the torsional elements are also preferably disposed in this plane.

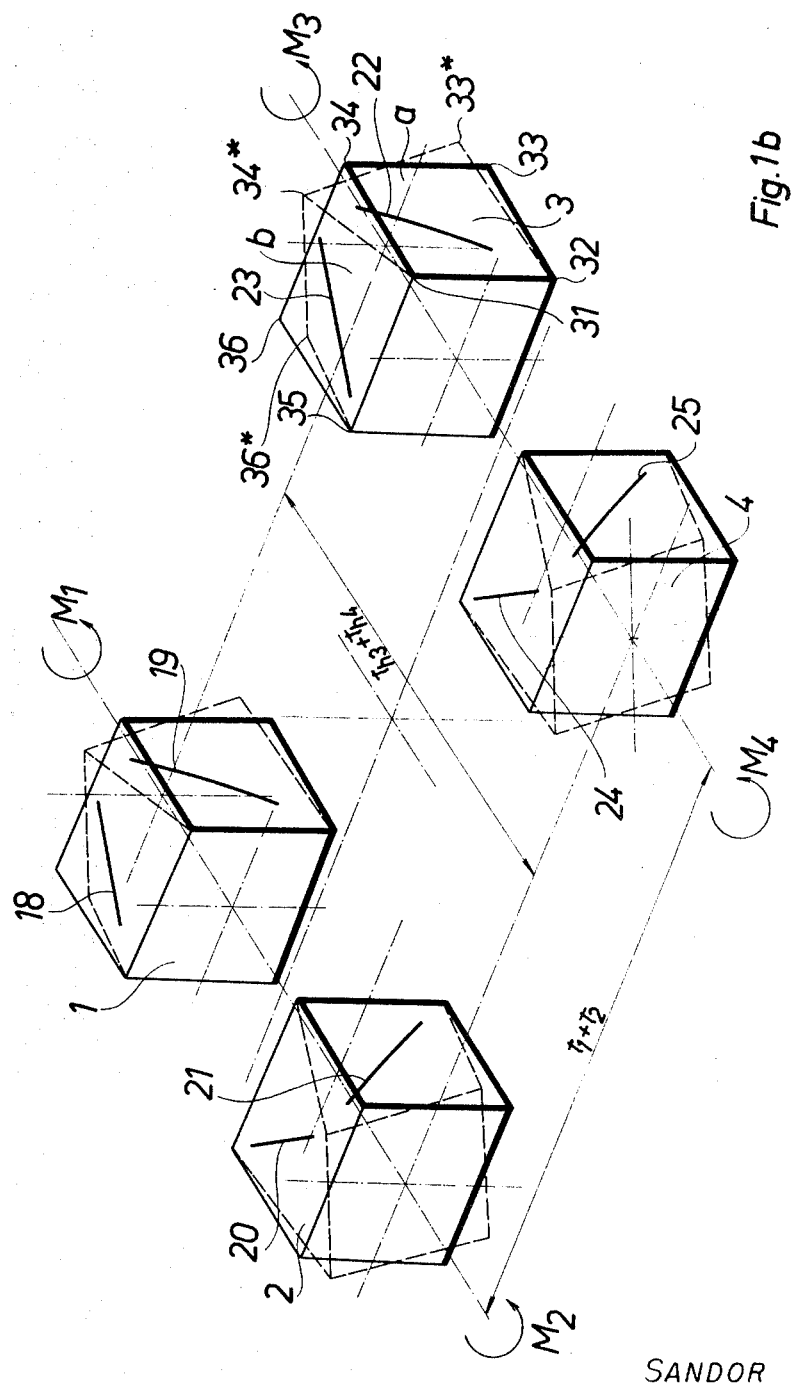

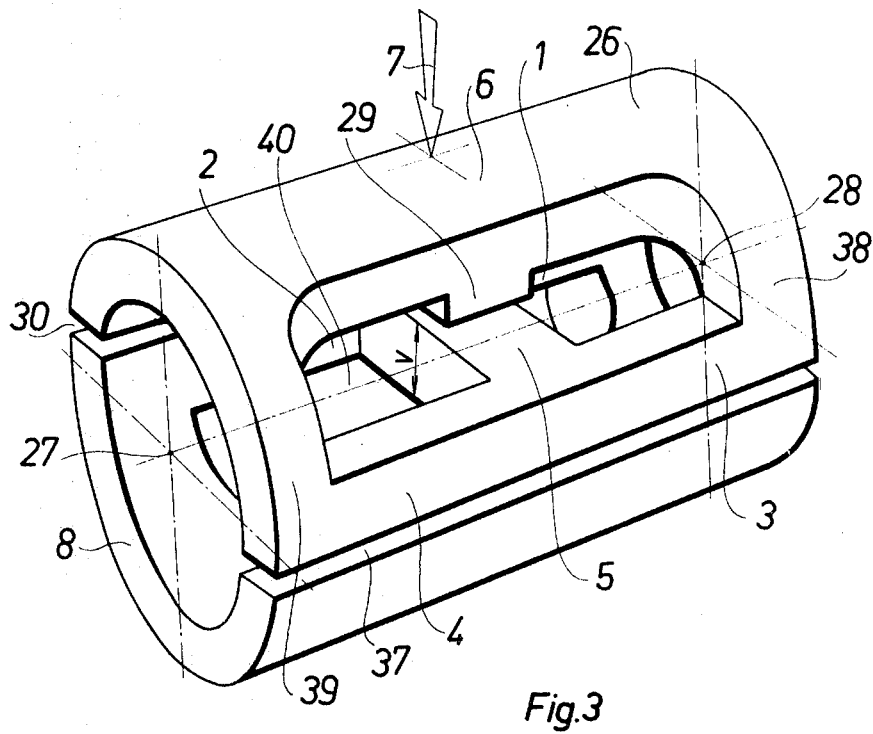
Fig.3
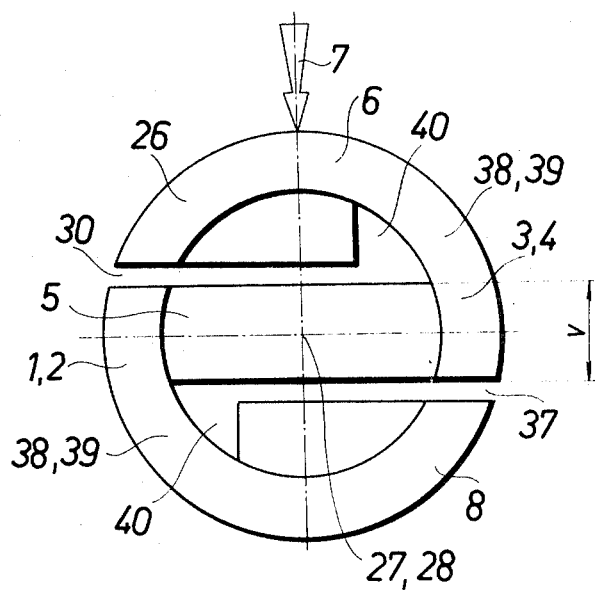
Fig.3.a
INVENTOR
SANDOR KOVÁCS
BY Young + Thompson
ATTORNEYS

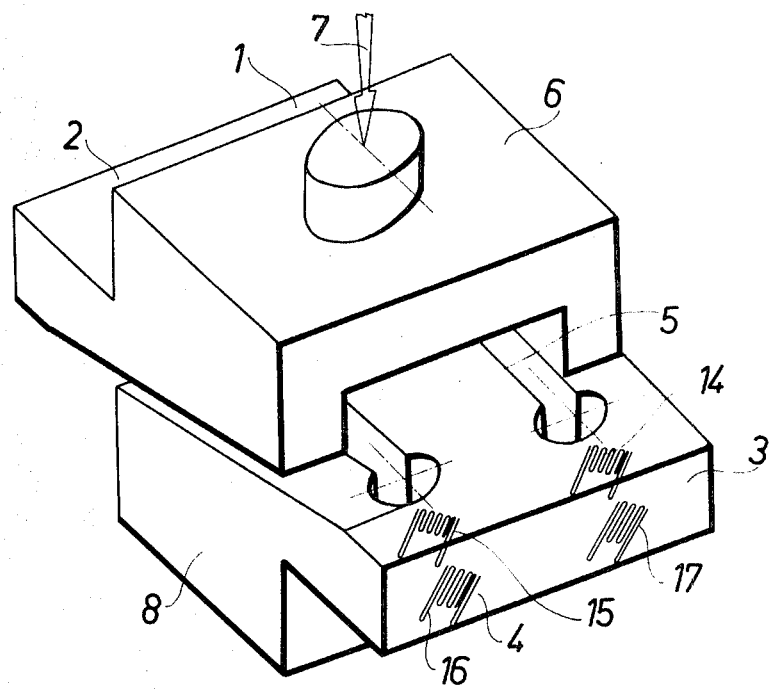
*Fig.5*
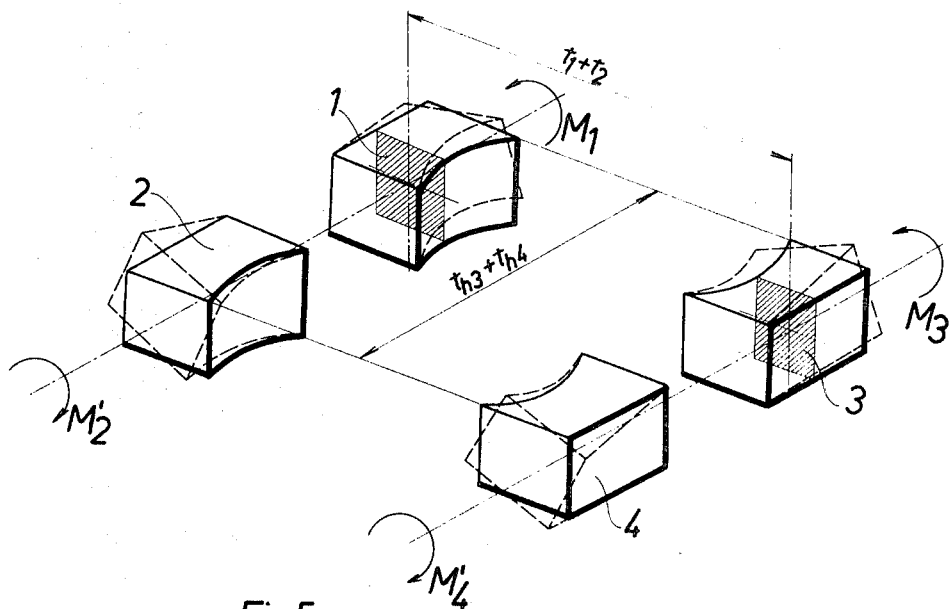
*Fig.5.a.*

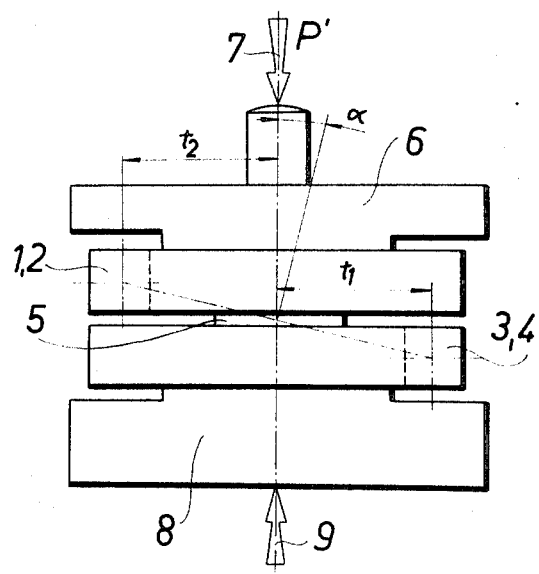
Fig.6
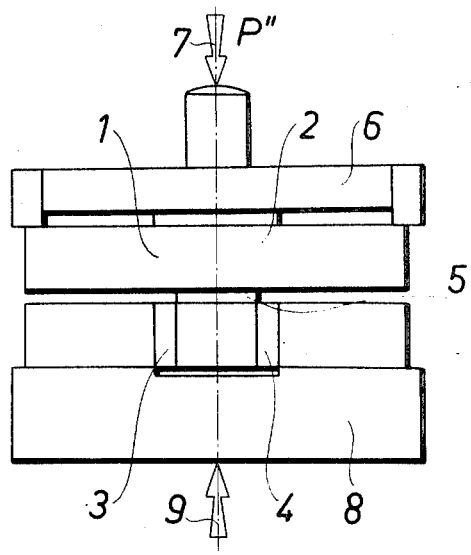
Fig.6.a
INVENTOR
SANDOR KOVÁCS
BY Young + Thompson
ATTORNEYS

TRANSDUCER WITH TORSIONAL SENSORS IN THE FORM OF STRAIN GAUGES

The present invention relates to transducers with torsional sensors for strain gauges. In devices of this type, the line of applied force should ideally be precisely predetermined and should not change during the measurement. However, in actuality, this line deviates from its ideal position and distorting forces are introduced.

Various proposals for eliminating these distorting forces have been proposed; but the apparatus for doing this in the past has been relatively insensitive and unsuitable in other ways.

Accordingly, it is an object of the present invention to provide transducers with torsional sensors for strain gauges, in which the sensing will be of high sensitivity and accuracy.

Another object of the present invention is the provision of such transducers which will be relatively simple and inexpensive to manufacture, easy to install, operate and read with facility and accuracy, and rugged and durable in use.

Other objects are advantages of the present invention will become apparent from a consideration of the following description, taken in connection with the accompanying drawings, in which:

FIG. 1b is a schematic perspective view of the torsional components of the present invention, showing in full line their unstressed position and in broken line their torsionally stressed position;

FIGS. 3 and 3a are views similar to FIGS. 1 and 1a, respectively, but showing another embodiment of the invention;

FIG. 4 is a view similar to FIG. 1, but showing still another embodiment of the invention;

FIG. 5a is a view similar to FIG. 1b, but corresponding to the embodiment of FIG. 5;

FIGS. 6 and 6a are side elevational views from different sides, of still another embodiment of the present invention, in which the plane common to the torsional axes of the torsional components is not perpendicular to the line of applied force.

Figure 1:
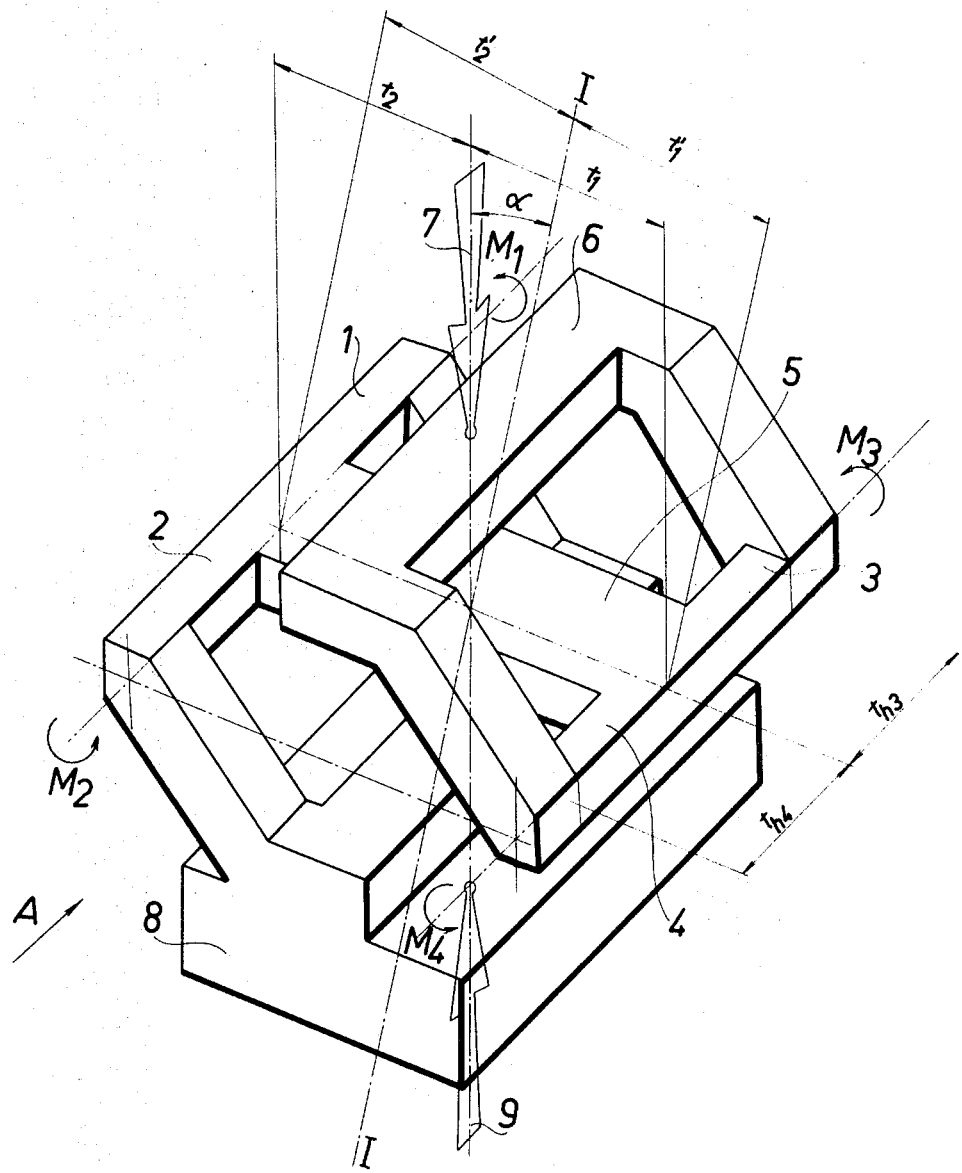
FIG. 1 is a somewhat schematic perspective view of a transducer according to the present invention.
Figure 1A:
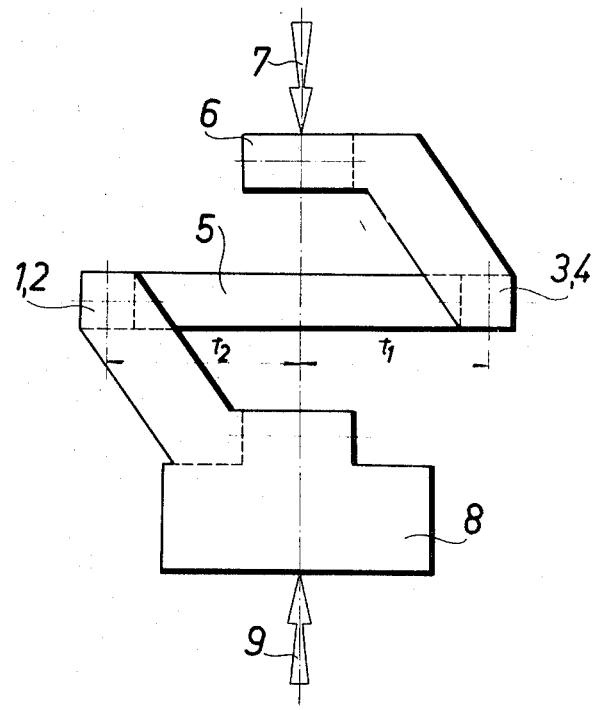
FIG. 1a is a side elevational view of the structure of FIG. 1.

Referring now to the drawings in greater detail, and first with respect to the embodiment of FIGS. 1, 1a, 1b and 2, it will be noted that four torsional components, 1, 2, 3, and 4 are provided which are interconnected by an integral connecting block 5. Upper and lower coupling members 6 and 8, respectively, are integral with the torsional components 1—4 through diagonal arms and provide the members against which the force to be measured and its reaction bear. In FIGS. 1 and 1a, the applied force is indicated by the arrow 7 and its reaction force by the arrow 9.

It will be noted that the components 1, 2, 3 and 4 are thus subjected to torsion about parallel axes in directions indicated by the arrows $M_1$, $M_2$, $M_3$ and $M_4$ in FIGS. 1 and 1b. The torsional axes of components 3 and 4 are coincident and parallel to the coincident torsional axes of components 1 and 2. When force and reaction are applied as shown by the arrows 7 and 9 in FIGS. 1 and 1a, then torsion is applied to the components 3 and 4 by an arm whose effective length is $t_1$, and to components 1 and 2 by an arm whose effective length is $t_2$, measured perpendicular to the torsional axes. Preferably, $t_1$ and $t_2$ are equal to each other.

The resulting deformations are indicated in FIG. 1b. Considering component 3, for example, the $a$ and $b$ lateral faces of this component are located by the points 31—36; and upon the application of torsion, these faces assume the positions shown by the points 31, 32, 33* and 34* for face $a$, and 31, 35, 36* and 34* for face $b$. Compressive stresses are thus imposed on the face $a$ in the direction of the diagonal 31, 33 and on face $b$ in the direction of the diagonal 34, 35; while tensile stresses are imposed on the face $a$ in the direction of the diagonal 32, 34 and on face $b$ in the direction of the diagonal 31, 36. The stresses are arranged similarly in components 1, 2 and 4 and need not be recited in detail. In components 1 and 2, the applied stress is proportional to the length $t_2$; and in the components 3 and 4, the applied stress is proportional to the length $t_1$.

Figure 2:
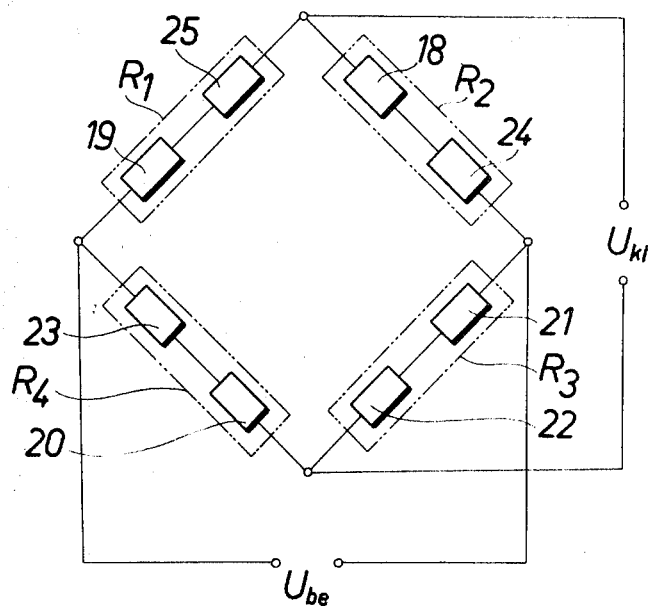
FIG. 2 is a simplified circuit diagram of a measuring bridge arrangement for the strain gauge resistors that are employed with the present invention.

However, it is also possible that $t_1$ will not be equal to $t_2$; and the means for compensating for this and other variations in the physical geometry of the system are indicated by a comparison of FIG. 1b and FIG. 2. Specifically, the arrangement of the measuring sensor resistances 18—25 in the bridge of FIG. 2 can be such as to compensate automatically for differences in the lengths $t_1$ and $t_2$, and also for differences in the lengths $t_{h3}$ and $t_{h4}$ which are the lengths of the arms by which the forces 7 and 9 act on the components 1—4, measured parallel to the torsional axes. As in the case of $t_1$ and $t_2$, so also $t_{h3}$ and $t_{h4}$ are preferably equal to each other; but if they are in fact not equal to each other, then the arrangement of the bridge of FIG. 2 automatically compensates for the difference.

With reference then to FIG. 2, it will be seen that to balance in all directions, therefore, the branch $R_1$ of the bridge of FIG. 2 is comprised by the strain gauge elements or resistances 19 and 25; the branch $R_2$ by the resistances 18 and 24; the branch $R_3$ by the resistances 21 and 22; the branch $R_4$ by the resistances 20 and 23. It will be noted that the resistances that are thus paired in series in each branch are those which are in the corresponding faces of diagonally opposite components and which are accordingly perpendicular to each other.

Referring again to FIG. 1, it will be noted that if the applied force acts along the line I-I, at an angle $\alpha$ to the direction previously considered, then only the component of that force which is parallel to the arrows 7 and 9 will cause deformation and will be measured.

Another embodiment of the invention is shown in FIGS. 3 and 3a, in which the components 1—4 are formed by the wall of a cylinder 26. Cylindrical cavities 27 and 28 are formed in the ends of the cylinder so that what remains comprises the connecting block 5 of a thickness V. Other portions of the cylinder at 29, 30, 37 and 40 can be removed by machining to leave ribs or torsion arms 38, 39, the device functioning as in the previous example.

Figure 4:
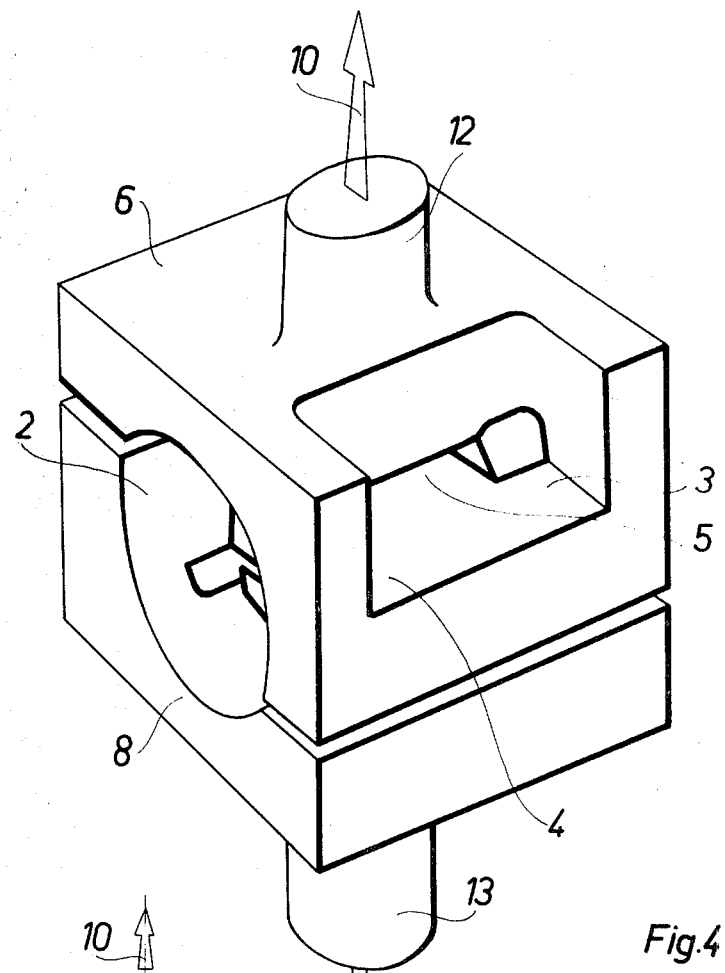
FIGS. 4 and 4a are also views similar to FIGS. 1 and 1a, respectively, but showing still another embodiment of the invention for measuring tensile loads.
Figure 4A:
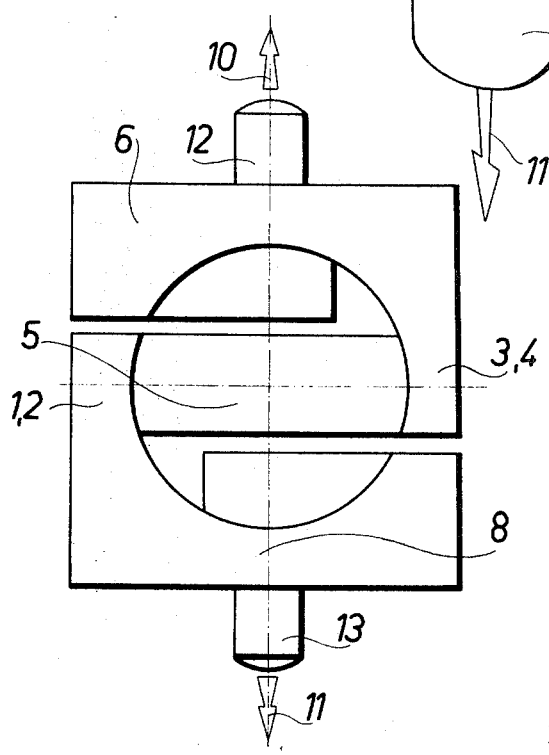

Still another example is shown in FIGS. 4 and 4a, in which the forces act in tension in the direction of the arrows 10 and 11 on upper stem 12 and lower stem 13 to stress the device, the operation otherwise being the same as in the preceding embodiments.

In FIG. 5, the strain gauge elements 14—17 are shown in greater detail. FIG. 5a indicates graphically the deformations in the system of FIG. 5, in the same manner as does FIG. 1b.

FIGS. 6 and 6a show a somewhat different embodiment, in which the plane common to the torsional axes of the components 1—4 is at an angle $\alpha$ to the direction of application of force. In this embodiment, as in the other embodiments, the torsional axes of the components are all disposed in a common plane, but the components themselves and the connecting block 5 are not all coplanar.

In view of the foregoing disclosure, therefore, it will be evident that the initially recited objects have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. An electromechanical measuring transducer for converting a linear force to be measured into torsion for measurement by torsional sensors, comprising a pair of parallel arms carrying said sensors at opposite ends thereof, a connecting block interconnecting said arms intermediate the length of said arms, a first pair of torsion applying arms connected to the ends of one of said parallel arms and extending away from the common plane of said parallel arms on one side of said plane, a second pair of torsion applying arms connected to the free ends of the other of said parallel arms and extending on the opposite side of said plane, and means rigidly interconnecting said torsion arms of each pair at points equidistant from the ends of said parallel arms.

2. A transducer as claimed in claim 1, having a plane of symmetry that passes through said points and that bisects said connecting block, said parallel arms being perpendicular to the last-named plane.